(12) United States Patent
Diehm et al.

(10) Patent No.: US 8,132,854 B2
(45) Date of Patent: Mar. 13, 2012

(54) MOTOR VEHICLE HAVING A WINDSHIELD WIPER COVER

(75) Inventors: Frank Diehm, Stuttgart (DE); Uwe Langer, Boeblingen (DE); Nico Wollitzer, Esslingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 131 days.

(21) Appl. No.: 12/631,469

(22) Filed: Dec. 4, 2009

(65) Prior Publication Data

US 2010/0212102 A1   Aug. 26, 2010

(30) Foreign Application Priority Data

Feb. 21, 2009   (DE) .................. 10 2009 010 031

(51) Int. Cl.
    *B60S 1/04* (2006.01)
(52) U.S. Cl. ........................................ 296/192
(58) Field of Classification Search ................ 296/192, 296/96.15; 15/250.27, 250.19, 250.351, 15/250.31, 250.001, 250.3, 250.201, 250.32, 15/250.34, 250.361, 250.43, 250.44, 250.48; 318/483, 443, 444
    See application file for complete search history.

(56) References Cited

U.S. PATENT DOCUMENTS

| | | | | |
|---|---|---|---|---|
| 2,936,477 A * | 5/1960 | Feller | .......................... | 15/250.19 |
| 3,120,673 A * | 2/1964 | Buchwald | .................... | 15/250.17 |
| 3,121,902 A * | 2/1964 | Massoll | ...................... | 15/250.17 |
| 3,694,846 A * | 10/1972 | Parker | ......................... | 15/250.16 |
| 3,845,983 A * | 11/1974 | Heintz | ............................ | 296/192 |
| 4,283,085 A * | 8/1981 | Sacco et al. | ................ | 296/96.17 |
| 4,285,540 A * | 8/1981 | Harada et al. | ................ | 296/192 |
| 4,342,126 A * | 8/1982 | Neefeldt | ........................ | 15/246 |
| 4,770,462 A * | 9/1988 | Kuraoka et al. | ............... | 296/192 |
| 4,852,205 A * | 8/1989 | Tanaka et al. | .............. | 15/250.17 |
| 4,962,564 A * | 10/1990 | Onda et al. | .................. | 15/250.19 |
| 4,982,993 A * | 1/1991 | Okazaki et al. | ............... | 296/192 |
| 5,082,078 A * | 1/1992 | Umeda et al. | ................... | 180/90 |
| 5,120,106 A * | 6/1992 | Sakurai et al. | ........... | 296/193.02 |
| 5,251,954 A * | 10/1993 | Vande Kopple et al. | ...... | 296/192 |
| 5,271,120 A * | 12/1993 | Eustache et al. | ........... | 15/250.01 |
| 5,504,966 A * | 4/1996 | Lee et al. | ................... | 15/250.19 |
| 5,561,882 A * | 10/1996 | Eustache et al. | .......... | 15/250.001 |
| 6,119,301 A * | 9/2000 | Nakatsukasa et al. | ...... | 15/250.21 |
| 6,327,738 B1 * | 12/2001 | Lewis | ....................... | 15/250.001 |
| 6,606,759 B1 * | 8/2003 | Hoshino | .................... | 15/250.21 |
| 6,691,368 B1 * | 2/2004 | Zimmer | ..................... | 15/250.31 |
| 6,830,288 B2 * | 12/2004 | Eynon et al. | .................. | 296/192 |
| 2005/0235448 A1 * | 10/2005 | Richard | ..................... | 15/257.01 |
| 2009/0261621 A1 * | 10/2009 | Usuda | ........................... | 296/192 |

* cited by examiner

*Primary Examiner* — Kiran B Patel

(57) ABSTRACT

A motor vehicle with a windshield wiper cover for covering a region located in front of a windshield in the direction of travel. The windshield wiper cover contains at least two elements which can be connected to each other via a double interlocking connection, and can each be fixed to the motor vehicle body. One of the two elements is configured as a service flap and, by being opened, permits access to a component arranged there below without the other element of the windshield wiper cover also having to be removed for this purpose.

9 Claims, 5 Drawing Sheets

MOTOR VEHICLE HAVING A WINDSHIELD WIPER COVER

CROSS-REFERENCE TO RELATED APPLICATION

This application claims the priority, under 35 U.S.C. §119, of German application DE 10 2009 010 031.8, filed Feb. 21, 2009; the prior application is herewith incorporated by reference in its entirety.

BACKGROUND OF THE INVENTION

Field of the Invention

The present invention relates to a motor vehicle with a windshield wiper cover for covering a region located in front of a windshield in the direction of travel. The invention also relates to a windshield wiper cover of this type.

Motor vehicles of the type in question having windshield wiper covers are quite well known, such windshield wiper covers customarily being formed from plastic and being pierced by the actual windshield wipers. Components, such as, for example, electronic control devices, which have to be accessible for maintenance are frequently arranged below the windshield wiper covers. In the case of known windshield wiper covers, access to the components arranged there below can be achieved only by removal of the entire windshield wiper cover, for which purpose not only the latter, but frequently also the windshield wipers have to be removed. Of course, this necessitates a relatively high outlay on installation and removal.

SUMMARY OF THE INVENTION

It is accordingly an object of the invention to provide a motor vehicle which overcomes the above-mentioned disadvantages of the prior art methods and devices of this general type, which is an improved embodiment in which access to a component located below a windshield wiper cover and installation of the windshield wiper cover are simplified.

With the foregoing and other objects in view there is provided, in accordance with the invention a motor vehicle. The motor vehicle contains a motor vehicle body, a windshield, and a windshield wiper cover for covering a region located in front of the windshield in a direction of travel. The windshield wiper cover contains at least two elements having a double interlocking connection for connecting the elements to each other. The elements are each fixed to the motor vehicle body. A first of the two elements is a service flap and, by being opened, the service flap permits access to a component disposed there below without a second of the two elements of the windshield wiper cover also having to be removed for this purpose.

The present invention is based on the general concept of configuring a windshield wiper cover for covering a region located in front of a motor vehicle windshield in the direction of travel in two parts, wherein one part is configured as a service flap and, by simply being opened, permits access to a component arranged there below. The windshield wiper cover according to the invention here contains at least two parts or elements which can be connected to each other via a double interlocking connection and can each be fixed to the motor vehicle body, in particular can be clipped thereto. By the configuration of one of the two elements as a service flap, the latter can simply be opened in the event of a corresponding servicing operation of a component located below the windshield wiper cover and, by this measure, provides access to the component arranged there below without the other element of the windshield wiper cover, i.e. the entire windshield wiper cover, also having to be removed. By the double interlocking connection between the two elements of the windshield wiper cover, the interlocking connection preferably being effective in the longitudinal and vertical directions of the vehicle, an additional measure of support can be omitted in this region, and the entire windshield wiper cover, i.e. both elements of the same, are connected merely at the edge to the body. At the same time, the double interlocking connection permits a defined and, above all, uniform joint, without steps, the double interlocking connection also permitting the windshield wiper cover to be delivered and installed as a single part, thus enabling changes in logistics and/or in the production sequence to be avoided.

In an advantageous development of the solution according to the invention, that element of the windshield wiper cover which is configured as a service flap has a permeable lattice structure. The components arranged below the windshield wiper cover frequently require cooling, which can be ensured in a simple manner, for example, by a lattice-like, i.e. by the air-permeable, structure of the service flap. Furthermore, such a lattice structure can favorably influence all of the flow conditions in a front end of a vehicle, for example in an engine compartment. Of course, it is also conceivable for an element of the windshield wiper cover configured in such a way to bring about merely purely aesthetic effects.

At least one of the two elements of the windshield wiper cover is expediently formed from plastic, in particular as an injection-molded plastic part. Injection-molded plastic parts permit the production of such a windshield wiper cover on the one hand with a high degree of quality and dimensional stability and on the other hand at comparatively low piece costs. In addition, structural changes to the motor vehicle can be reacted to in a relatively flexible manner, since all that needs to be done for this is to change the corresponding injection-molding die. Another advantage in this case is that such injection-molded plastic parts can be virtually freely configured in particular with regard to the coloring thereof.

In another advantageous embodiment of the solution according to the invention, the two elements of the windshield wiper cover are connected to each other at their connecting edge via at least one bayonet catch. Such a bayonet catch ensures on the one hand that that element of the windshield wiper cover which is configured as a service flap can be easily installed and removed, but on the other hand also can be connected extremely reliably and in particular in a play-free manner to the second element of the windshield wiper cover. Furthermore, the bayonet catches can be configured in such a manner that, in the closed state, they produce a windshield wiper cover which essentially corresponds in terms of the properties thereof to a single-piece element. A particular advantage of such a connection of the two elements of the windshield wiper cover also resides in the possibility of setting a particularly exact gap size, thus enabling a demand for high quality to be satisfied. An additional securing of the at least one bayonet catch is provided by the edge-side fixing elements of the service flap, via which the service flap is fixedly connected to the motor vehicle body. In order to release, i.e. to open, the service flap, the edge-side fixing elements therefore have to be released first in order then to be able to release the at least one bayonet catch. On the other hand, removal of the other element of the windshield wiper cover, which would in particular also require removal of the windshield wipers, is not necessary. In this case, the edge-side fixing elements can be configured as simple latching or clip-type elements or else can be realized by screw connections.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
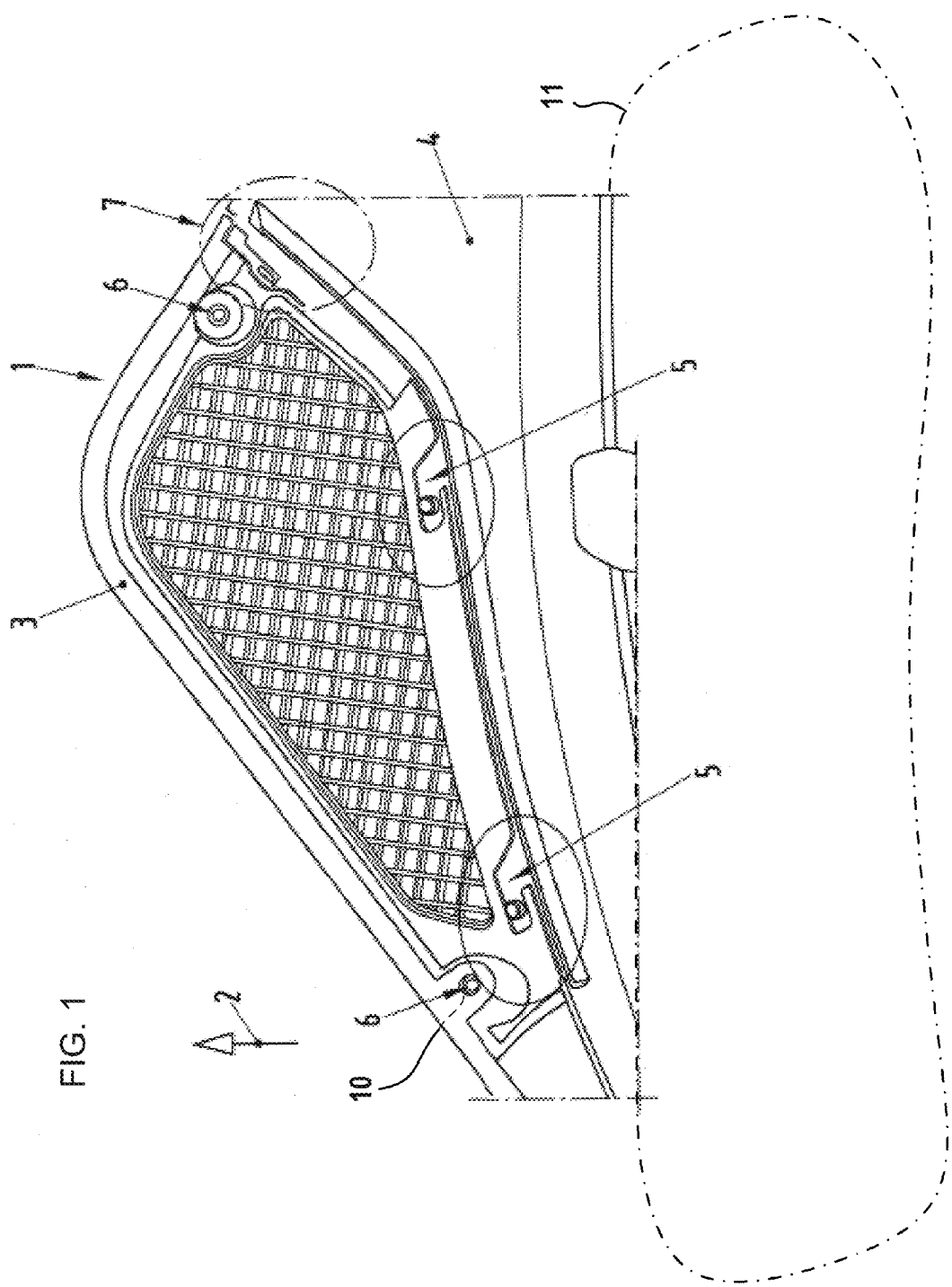
FIG. 1 is a diagrammatic, bottom view of a windshield wiper cover according to the invention.
Figure 4:
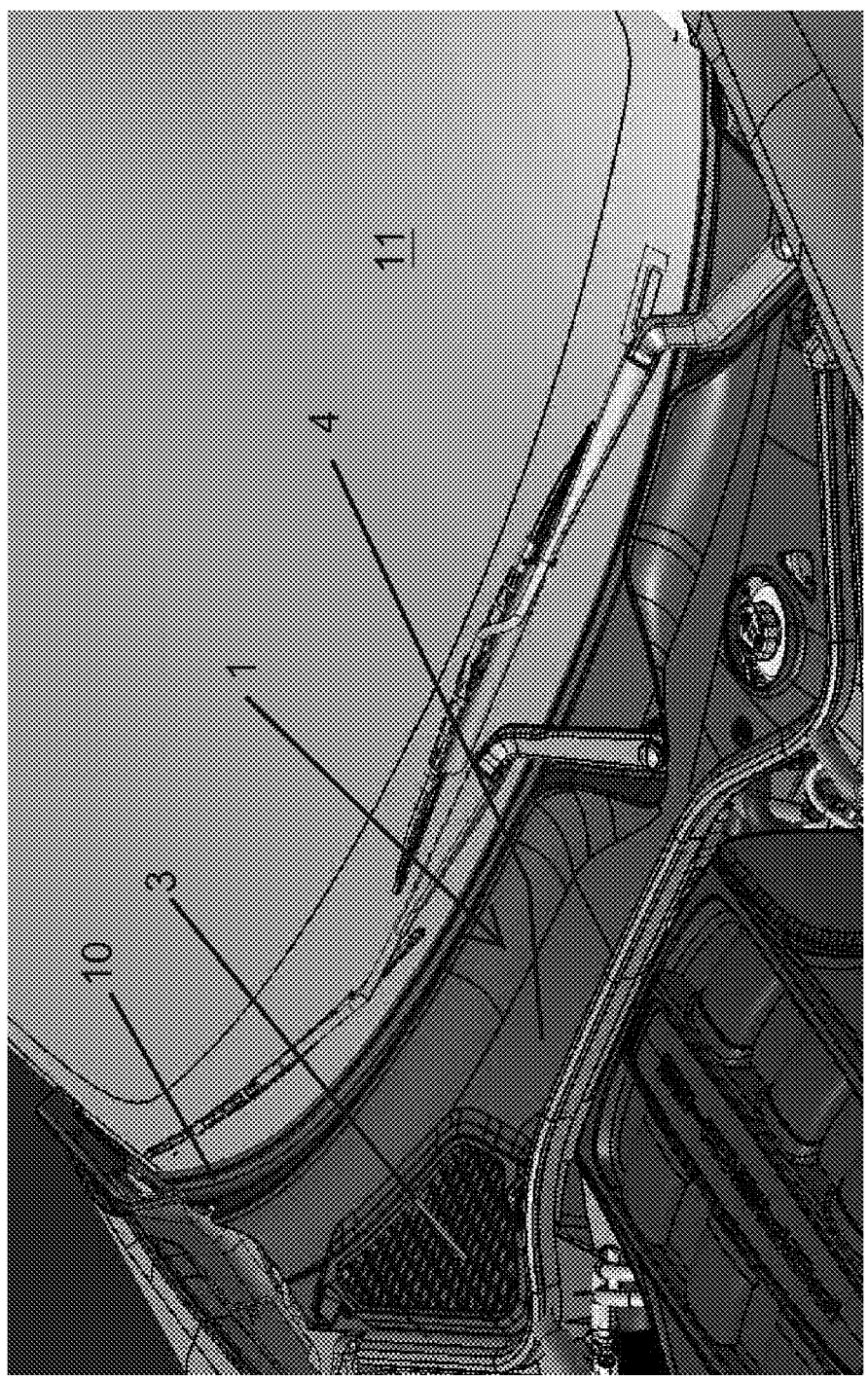
FIG. 4 is an illustration of a vehicle incorporating the windshield wiper cover.
Figure 5:
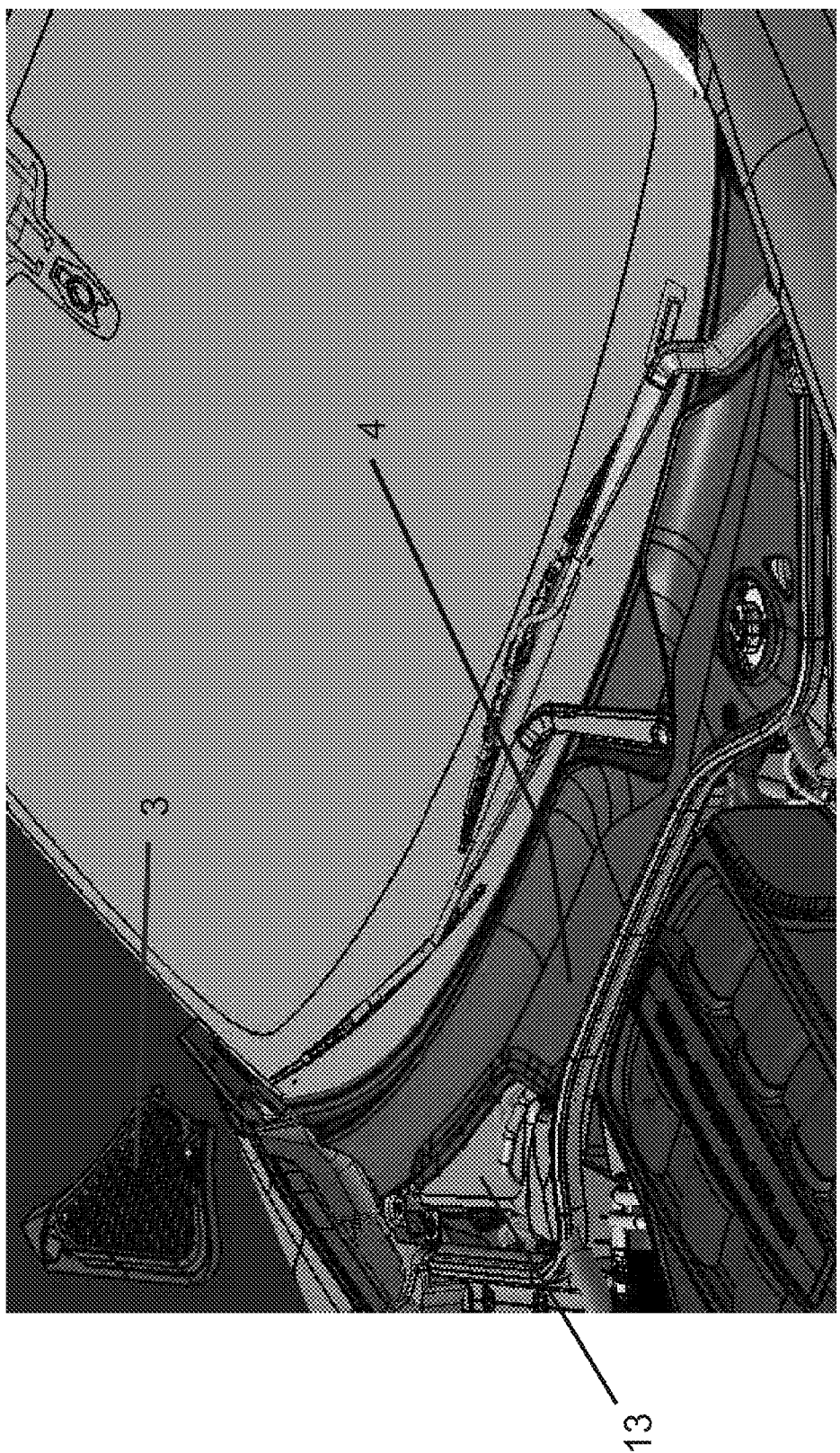
FIG. 5 is an illustration showing a service flap removed from a second element of the windshield wiper cover.

Referring now to the figures of the drawing in detail and first, particularly, to FIG. 1 thereof, there is shown a windshield wiper cover 1 according to the invention for covering a region 12 located in front of a motor vehicle windshield 11 in a direction of travel 2 formed in two parts, i.e. from two elements 3 and 4, which can each be fixed, i.e. independently of each other, to a motor vehicle body 10. According to the invention, the element 3 is configured as a service flap 3 and therefore, by being opened, permits access to a component 13 arranged there below, for example for a control device, without the other element 4 of the windshield wiper cover 1 also having to be removed for this purpose. Non-illustrated windshield wipers are customarily guided by the element 4 of the windshield wiper cover 1, and therefore removal of the element 4 requires a comparatively high degree of effort. In comparison to previous, single-part windshield wiper covers, the windshield wiper cover 1 according to the invention therefore has the great advantage of significantly simplifying access, for example for maintenance purposes, to components arranged below the element 3, since only the element 3 has to be removed for this purpose, rather than also the element 4 and therefore the entire windshield wiper cover 1. FIG. 4 shows the windshield wiper cover 1 integrated into the front end of the motor vehicle. FIG. 5 shows the service flap or element 3 removed from the other element 4, thus allowing access to the component arranged there below.

Figure 2:
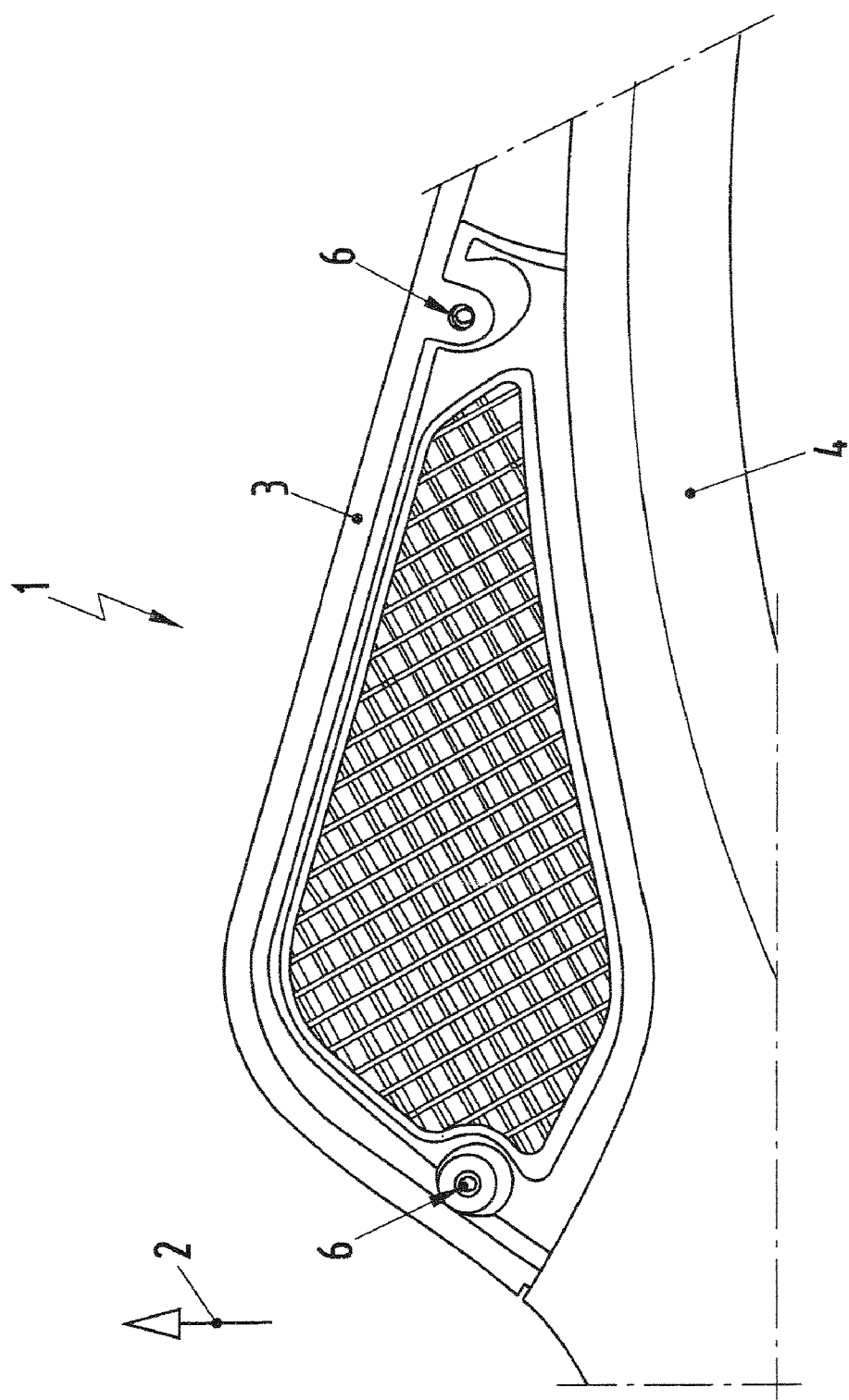
FIG. 2 is a top view of the windshield wiper cover illustrated in FIG. 1.
Figure 3:
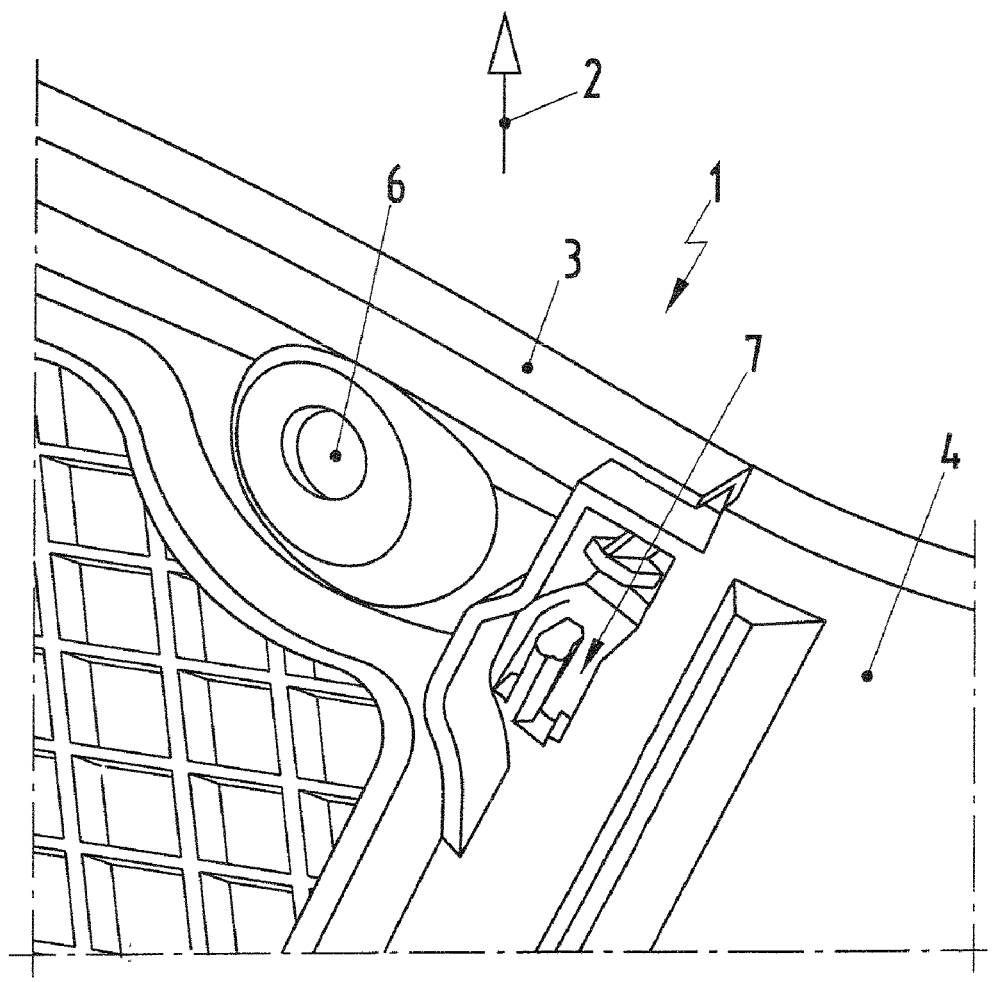
FIG. 3 is an illustration of a detail of a clip connection between two elements of the windshield wiper cover.

The two elements 3 and 4 can be fastened to the motor vehicle body 10, for example, via screw connections, or, more simply, via latching or clip connections which ensure a comparatively simple installation and removal. Fixing points 6 are shown in FIGS. 1 to 3, via which the element 3 can be connected, in particular clipped, to the body 10. Of course, similar fixing points are also provided in the region of the element 4, in particular on the edge side of the same. By contrast, a connection between the two elements 3 and 4 of the windshield wiper cover 1 is preferably realized via a double interlocking connection, for example via at least one bayonet connection 5, according to FIG. 1 via two bayonet connections 5 which are intended to enable the two elements 3 and 4 to be reliably secured on each other and to enable a comparatively easy release. In this case, the double interlocking connection is preferably effective in the longitudinal and vertical directions of the vehicle. Of course, release of the at least one bayonet catch 5 is possible only if the element 3 is released from the body at the fixing points 6. In addition, the two elements 3 and 4 of the windshield wiper cover 1 can be connected to each other via at least one latching connection 7 (see in particular the illustration of the detail in FIG. 3). In general, the double interlocking connection according to the invention of the two elements 3 and 4 to each other affords the great advantage that, by use of, for example, the bayonet connections 5 and/or the latching connection 7, an exact gap size and, as a result, a constant joint without a jump in height can be realized. Furthermore, the double interlocking connection permits the windshield wiper cover 1 to be supplied and installed as a single part, thus enabling changes in the logistics and/or in the production sequence to be avoided. The double interlocking connection defines the relative position of the two elements 3, 4 to each other.

In order to be able to produce the windshield wiper cover 1 according to the invention as cost-effectively as possible and with the greatest possible quality, at least one of the two elements 3, 4 of the windshield wiper cover 1 is formed from plastic, in particular from polypropylene and/or as an injection-molded plastic part. Such injection-molded plastic parts permit a comparatively cost-effective, but high-quality manufacturing of the elements 3 and 4. Furthermore, the selected connections between the two elements 3, 4, i.e., for example, the bayonet catches 5 and the latching connection 7, render an additional measure for supporting the windshield wiper cover 1 in this region superfluous, and therefore the two elements 3, 4 of the windshield wiper cover 1 merely have to be supported at the edge on the body.

As can furthermore be gathered in particular from FIGS. 1 to 3, that element 3 of the windshield wiper cover 1 which is configured as a service flap can have a permeable lattice structure, thus enabling in particular an improved cooling effect to be obtained for the components, for example control devices, arranged there below.

A particular advantage of the windshield wiper cover 1 according to the invention is that, with the latter, access to components located below the windshield wiper cover 1 is possible in a simple manner merely by the element 3 of the windshield wiper cover 1 being removed. It is possible as a result not to have to remove the element 4 through which, for example, the windshield wipers are guided and which would mean a comparatively high outlay on removal.

The invention claimed is:

1. A motor vehicle, comprising:
a motor vehicle body;
a windshield; and
a windshield wiper component cover for covering a region located in front of said windshield in a direction of travel, said windshield wiper component cover containing at least two elements having a bayonet connection for connecting said elements to each other, said elements each being fixed directly to said motor vehicle body, a first of said two elements being a service flap and, by being removed via a release of said bayonet connection, said service flap permitting access to a component disposed there below without a second of said two elements of said windshield wiper component cover also having to be removed for this purpose.

2. The motor vehicle according to claim 1, wherein at least one of said two elements of said windshield wiper component cover is screwed to said motor vehicle body.

3. The motor vehicle according to claim 1, wherein said first element of said windshield wiper component cover being said service flap has a permeable lattice structure.

4. The motor vehicle according to claim 1, wherein at least one of said two elements of said windshield wiper component cover is formed from plastic.

5. The motor vehicle according to claim 1, wherein said windshield wiper component cover has at least one bayonet catch for forming said bayonet connection.

6. The motor vehicle according to claim 1, wherein said windshield wiper component cover has at least one latching connection for connecting said two elements to each other.

7. The motor vehicle according to claim 1, wherein said two elements of said windshield wiper component cover are only supported at an edge on said motor vehicle body.

8. The motor vehicle according to claim 1, wherein at least one of said two elements of said windshield wiper component cover is formed from polypropylene.

9. The motor vehicle according to claim 1, wherein at least one of said two elements of said windshield wiper component cover is an injection-molded plastic part.

* * * * *